United States Patent Office

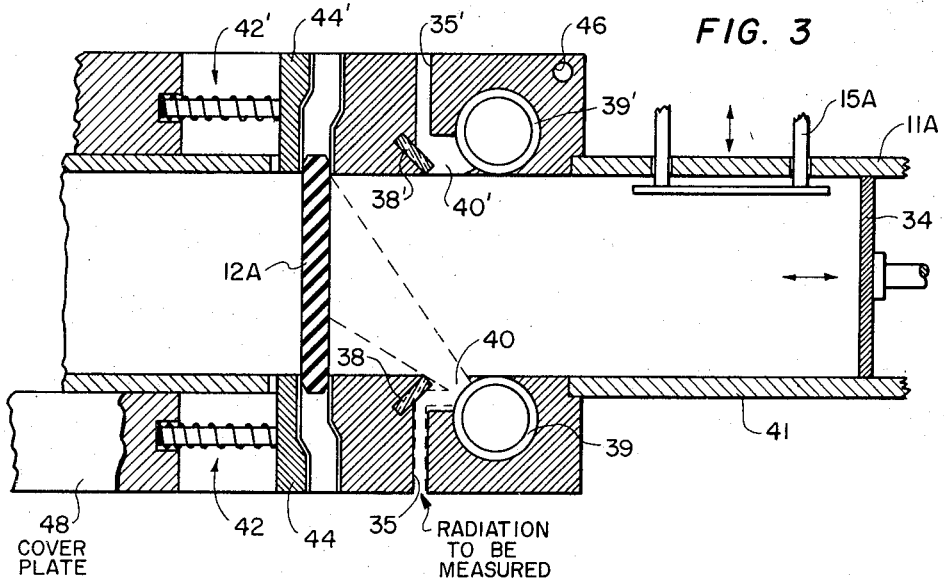
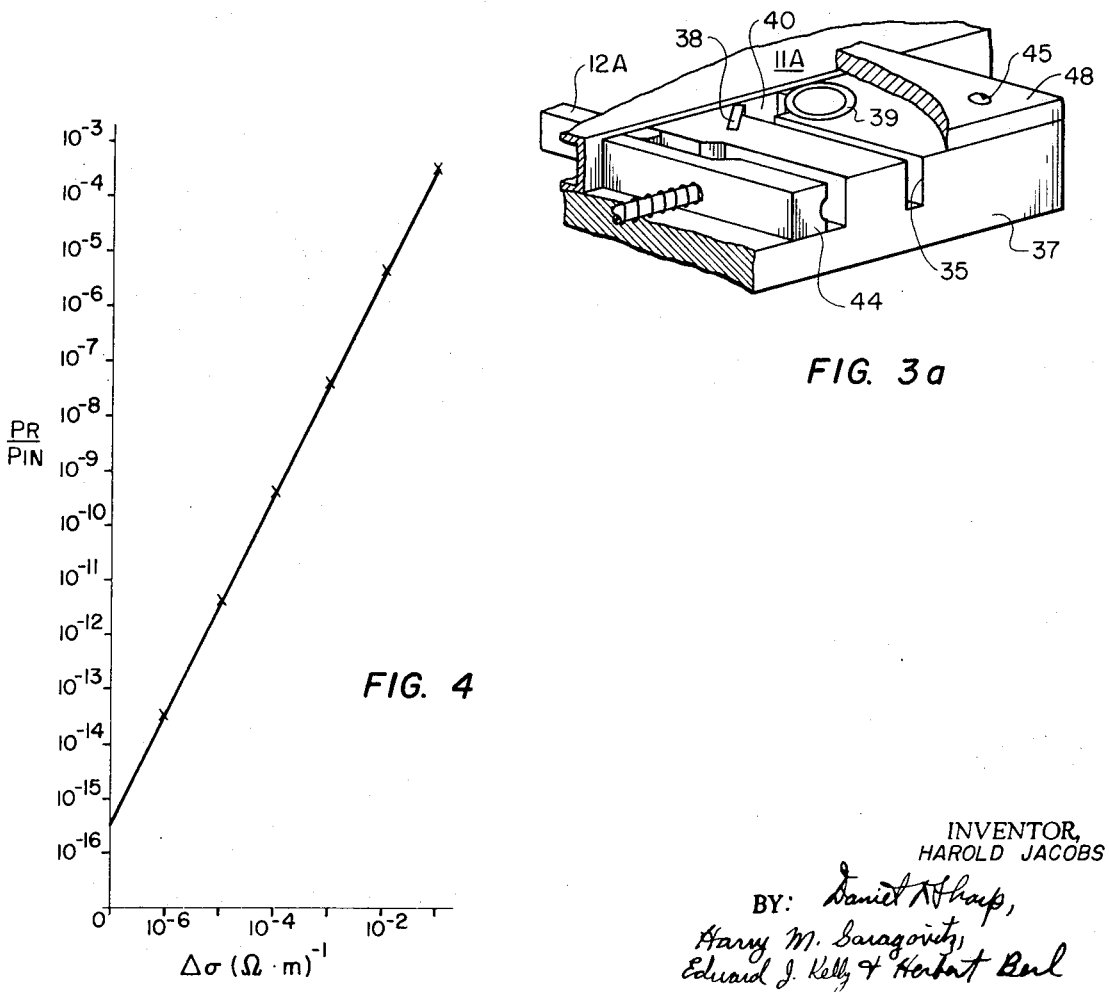

3,718,820
Patented Feb. 27, 1973

3,718,820
PHOTON RADIATION DETECTOR
Harold Jacobs, West Long Branch, N.J., assignor to the United States of America as represented by the Secretary of the Army
Filed May 25, 1971, Ser. No. 146,766
Int. Cl. G01f 1/16
U.S. Cl. 250—83.3 H                         17 Claims

ABSTRACT OF THE DISCLOSURE

A sensitive detector of incoming radiation, for example, infrared radiation, having a thin panel of a semiconductor material, the conductivity of which is a function of intensity of said incoming radiation, placed across a microwave waveguide into which microwave energy is supplied. If the waveguide is provided with tuning elements to control both attenuation and line-length in the region between the semiconductor panel and a microwave short, a lossy reflection cavity is formed and, by proper adjustment of said tuning elements, the microwave power reeflcted from the semiconductor panel and coupled through a directional coupler to an indicating device can be minimized. Conductivity changes in the semiconductor material resulting from exposure to said incoming radiation cause corresponding changes in the reflected electric field to occur which is proportional to the conductivity, and the consequent change in reflected power propagating through the directional coupler can be detected by conventional microwave detecting means and supplied to an indicating device calibrated to read intensity of the incoming radiation.

BACKGROUND AND SUMMARY OF THE INVENTION

One of the difficulties with present photon detectors for sensing radiation in the infrared regions of the electromagnetic spectrum is that they are essentially point detectors and, as such, are unable to detect incident energy of wide beam width or at appreciable angles with respect to the principal axis.

In accordance with the invention, a photodetector operating, for example, over the visible to infrared region of the electromagnetic spectrum, is obtained which has a large angle of acquisition (for example, radiation in a 35 to 40 degree wide pattern), while, at the same time, having a sensitivity comparing favorably with that of other known infrared detectors. This characteristic can be achieved, in part, by using a very thin semiconductor panel which makes up one boundary of a microwave cavity, thereby providing a large area detector which is relatively insensitive to angle. Microwave energy is supplied to a waveguide-directional coupler assembly with a thin semiconductor panel transversely mounted within the waveguide and having a cross-sectional area limited only by the cross-sectional area of said waveguide. The end of the waveguide remote from the microwave input end is provided with means serving as a microwave short circuit; this short circuit means may be transparent to the infrared radiation to be detected, in which case, the infrared energy passes directly through the microwave short and impinges upon the semiconductor panel. If the microwave short is not optically transparent, separate means must be provided for illuminating the semiconductor panel, as, for example, slits in the waveguide wall through which the infrared radiation can pass. The incoming radiation incident upon the semiconductor panel changes the conductivity of said panel and, hence, the amount of microwave energy reflected therefrom. This reflected energy is supplied by way of a directional coupler and conventional microwave detector to an indicating device, such as a meter, for measuring the intensity of incoming radiation as a function of the detected reflected microwave energy. In the portion of the waveguide between the semiconductor panel and the microwave short is positioned an adjustable waveguide tuner to control the effective length of said waveguide portion and also a variable attenuator which permits variation of the conductivity of said portion of the waveguide. Instead of an adjustable tuner for controlling the effective length of said waveguide portion, the microwave short itself can be moveable to serve as the adjustable tuner. By proper adjustment of the tuner and attenuator, a tuned circuit can be obtained which maximizes the detector sensitivity; that is, the reflected power is practically eliminated and the system is nulled. Any change in semiconductor conductivity such as due to incident radiation, will result in large changes in reflected power.

DESCRIPTION OF THE DRAWINGS

FIGS. 3 and 3a illustrate a second embodiment of the invention, with FIG. 3a showing a portion of the detector of FIG. 3 in greater detail; and FIG. 4 is a curve illustrating the relationship between the reflected power and change in conductivity of a typical semiconductor used in the devices of FIGS. 2 and 3.

DESCRIPTION OF THE PREFERRED EMBODIMENT

Figure 1:
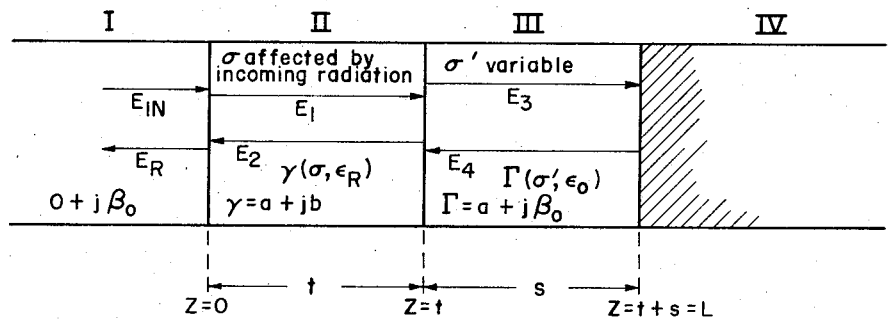
FIG. 1 illustrates an equivalent four-layer reflection system such as used in the devices of FIGS. 2 and 3.

Before describing the detectors of the invention, reference is made to FIG. 1 which describes a four-layer reflection system consisting of air, a semiconductor panel, an air gap and a metal reflector, in the order named. It should be noted that FIG. 1 does not show the media I to IV to scale; for example, the semiconductor medium II, in practice, will be a very thin panel; moreover, the medium IV need be only a thin metallic member which serves as a microwave short circuit. Microwave energy can be substantially completely absorbed by the semiconductor (medium II), if the conductivity $\delta$ in (ohm-meter)$^{-1}$ and the relative permittivity $\epsilon_R$ of the semiconductor (equal to the ratio of the permittivity of the dielectric to the permittivity of free space), as well as the thickness $t$ of the semiconductor and the air gap length $s$ are chosen properly. The system of FIG. 1 may be considered as a transmission line comprising a region I of air with a propagation constant equal to $0+j\beta_0$, (where $$\beta_0 = \frac{2\pi}{\lambda_0}\sqrt{1-\left(\frac{\lambda_0}{\lambda_c}\right)^2}$$

and $\lambda_0$ is the microwave wavelengths in meters in free space and $\lambda_c$ is the cutoff wavelength of the guide in meters) through which the microwave energy is travelling (for air, the attenuation constant is assumed equal to zero), a semiconductor II of thickness $t$ and propagation constant $\gamma=a+jb$ upon which the microwave radiation falls, a region III of air of thickness $s$ and propagation constant $\Gamma=\alpha+j\beta_0$. The microwave electric field incident on the semiconductor panel (medium II) is represented as $E_{IN}$ and the reflected microwave field as $E_R$. Reflection and transmission at the various layers is indicated by the arrows in FIG. 1 labelled $E_1$, $E_2$, $E_3$ and $E_4$. This system is analyzed in detail in a US Army Electronics Command Technical Report ECOM–2774 of October 1966 by Harold Jacobs, George Morris and Ronald Hofer, entitled "An Interferometric Effect with Semiconductors in the Millimeter Wave Region," and US Army Technical Report ECOM-3256, dated June 1970, by Paul Locke and Harold Jacobs entitled "New Infrared Detector Using Microwave Techniques."

As indicated in FIG. 1, the propagation constant $\gamma$ of medium II is a function of $\delta$, and of $\epsilon_R$ which, for germanium is equal to 16. Also, the propagation constant $\Gamma$ of medium III is a function of $\epsilon_0$, the free space permittivity = $8.85 \times 10^{-12}$ farad/meter and of $\delta'$, the conductivity of the medium III.

It is to be noted that medium III in the equivalent circuit of FIG. 1 is a hypothetical medium which has the wave number $\beta_0$ corresponding to an air filled waveguide (dielectric constant of air) but still can have a conductivity $\delta'$ which can be adjusted for mechanical or electronic tuning means. The conductivity $\delta'$ is equivalent to an attenuation constant $\alpha$ for this medium. Physically this equivalent circuit concept is used to represent an air filled waveguide with a variable attenuator in the waveguide to give a slight adjustment.

Using Maxwell's equations for sinusodial voltage and current waveforms, assuming $E_{IN}$ is known, five equations in five unknowns are obtained.

at $z=0$,
$$E_{IN}+E_R=E_1+E_2 \quad (1)$$
and
$$J\beta_0(E_{IN}-E_R)=\gamma(E_1+E_2) \quad (2)$$
at $z=t$,
$$E_1 e^{-\gamma t}+E_2 e^{\gamma t}=E_3 e^{-\Gamma t}+E_4 e^{\Gamma t} \quad (3)$$
and
$$\gamma E_1 e^{-jt}-\gamma E_2 e^{\gamma t}=\Gamma E_3 e^{-\Gamma t}-\Gamma E_4 e^{-\Gamma t} \quad (4)$$
at $z=t+s=L$
$$E_3 e^{-\Gamma s}+E_4 e^{\Gamma s}=0 \quad (5)$$

which can be solved by Cramer's Rule, to yield the reflection coefficient $$\frac{E_R}{E_{IN}}=\frac{j\frac{\beta}{\Gamma}\tanh(\Gamma s)\left\{j\frac{\gamma}{\beta}\tanh(\gamma t)-1\right\}+\left\{j\frac{\beta}{\gamma}\tanh(\gamma t)-1\right\}}{j\frac{\beta}{\Gamma}\tanh(\Gamma s)\left\{j\frac{\gamma}{\beta}\tanh(\gamma t)+1\right\}+\left\{j\frac{\beta}{\gamma}\tanh(\gamma t)+1\right\}} \quad (6)$$

where the propagation constants for the various media are $$j=\sqrt{\left(\frac{\pi}{p}\right)^2-\omega^2\mu\epsilon_0} \quad \text{Open waveguide, Medium 1} \quad (7)$$

$$\gamma=\sqrt{\left(\frac{\pi}{p}\right)^2-\omega^2\mu\epsilon_0\epsilon_R+j\omega\mu\sigma} \quad \text{Dielectric Medium 2} \quad (8)$$

$$\Gamma=\sqrt{\left(\frac{\pi}{p}\right)^2-\omega^2\mu\epsilon_0+j\omega\mu\sigma'} \quad \text{Hypothetical Medium 3} \quad (9)$$

and $p=$ width of waveguide
$\omega=2\pi f$
$\mu=4\times 10^{-7}$ henry/meter.

One of the conditions essential for achieving minimum microwave reflection from medium II, assuming a lossless medium I (i.e., an attenuation constant equal to zero), derivable from Equation 6 is that $$\tan bt \tan \beta_0 s = \frac{1}{\sqrt{\epsilon_R}} \quad (10)$$

where $b$ and $\beta_0$ are the imaginary portions (phase constants) of the propagation constants $\gamma$ and $\Gamma$ for media II and III, respectively, $t$ is the semiconductor thickness and $\epsilon_R$ is equal to the ratio of the permittivity of free space to the permittivity for the medium. Since the length of the medium III can be adjusted to any value, $\tan \beta_0 s$ can be made to take on values from minus infinity to plus infinity and, thus, the condition set forth in Equation 1 can be always met by varying the spacing $s$. In practice, this can be accomplished by varying the position of the microwave short (medium IV) relative to the semiconductor until a condition of minimum reflection is obtained.

If one assumes a lossless medium III, it can be shown that the second condition necessary for minimum microwave reflection from the semiconductor is $$at \cong \tanh^{-1}\frac{1}{\sqrt{\epsilon_R}} \quad (11)$$

where $a$ is the real portion (attenuation constant) of the propagation constant $\gamma$ for the semiconductor medium II. In free space, the attenuation constant $a$ is given by $$a=\frac{\delta\eta}{2} \quad (12)$$

where $\delta$ is the conductivity of the semiconductor, $\eta$ is the impedance of the semiconductor which is equal to the ratio of the impedance of air (377 ohms) to the square root of $\epsilon_R$. For a given semiconductor material, $\epsilon_R$, is a constant, so that, since $\eta/2$ is a constant, one can rewrite Equation 12 as $$a=k\delta \quad (13)$$

The attenuation constant $a_{dg}$ for the semiconductor mounted in a waveguide is different from the attenuation constant $a$ in free space, viz, $$a_{dg}=\frac{\delta\eta}{2}\frac{1}{[1-(\lambda_d/\lambda_c)^2]^{1/2}} \quad (14)$$

where $\lambda_c$ is the cutoff wavelength and $\lambda_d$ is the wavelength in the semiconductor. In other words, the parameter $a$ for medium II, which will be referred to here as $a_{II}$, should be written as $$a_{II}=k'\delta \quad (15)$$
where $$k'=\frac{1}{\left[1-\left(\frac{\lambda d}{\lambda c}\right)^2\right]^{1/2}}\cdot k \quad (16)$$

One can now rewrite Equation 11 as $$t\cong\tanh^{-1}\frac{1}{\sqrt{\epsilon_R}} \quad (17)$$

The thicker (larger volume) the semiconductor, the more infrared energy is required to change the conductivity thereof; that is, more photons are required to change the bulk conductivity. By using a thin semiconductor, then, the sensitivity of the detector can be greatly enhanced. From Equation 17, it is obivous that, if one is to make $t$ small, in order to maximize sensitivity, it normally would be necessary also to increase $\delta$. However, this is undesirable, since sensitivity of the semiconductor is an inverse function of $\delta$, in addition to being an inverse function of thickness $t$. In other words, the dark or null conductivity of the semiconductor should be as small as possible in order to provide a larger sensitivity ratio when impinged upon by infrared radiation. In order to permit operation with a semiconductor of small $\delta$ and small $t$, it is necessary to obtain an increased system effective $\delta$ by introducing attenuation into the medium III, which has conductivity $\delta'$; that is by adding $\delta'$ to the attenuation constant of medium III (which normally would have been substantially zero), and adjusting the attenuation in medium III until a condition of minimum reflection is obtained. In practice, $s$ and $\delta'$ will be sequentially adjusted in alternate fashion for minimum reflection.

Figure 2:
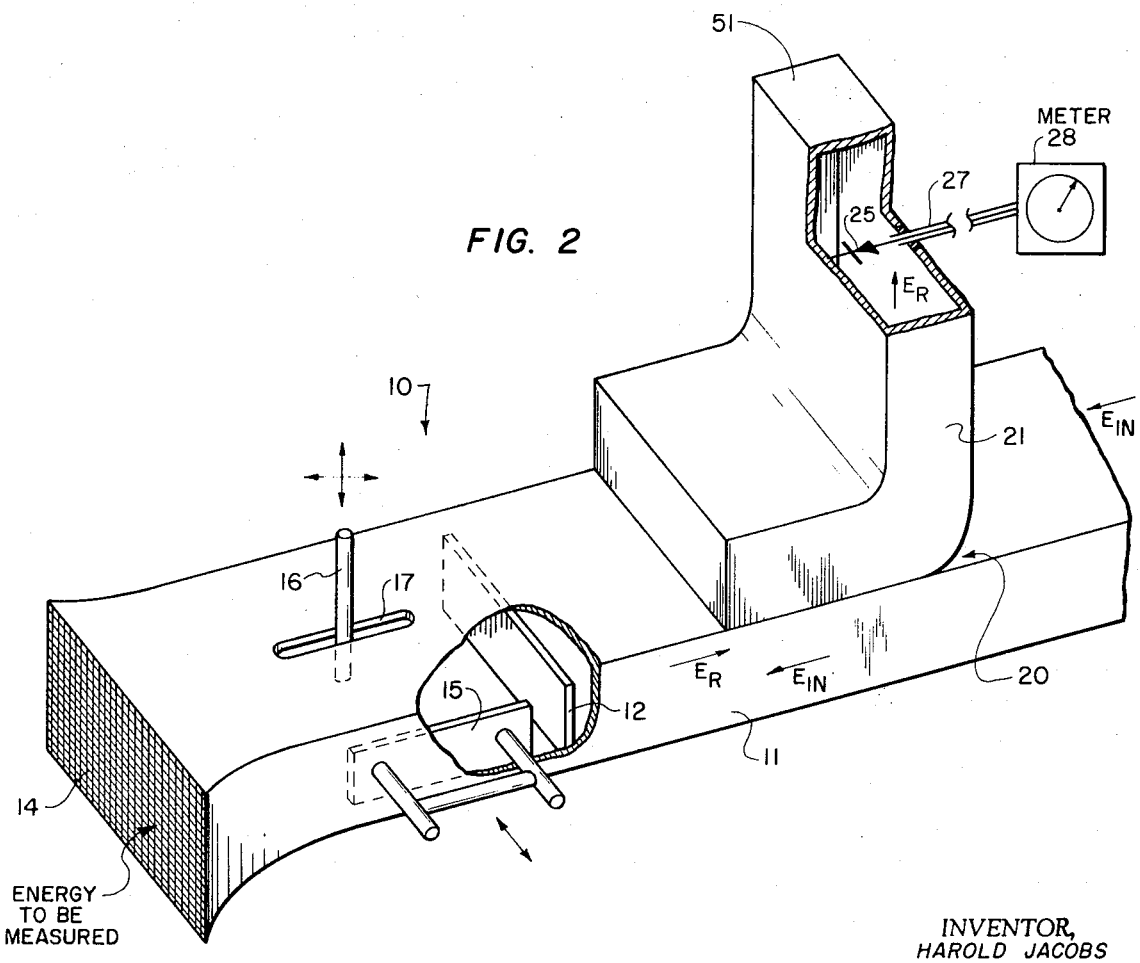
FIG. 2 illustrates a first embodiment of a detector in accordance with the invention.

Referring now to FIG. 2 of the drawing, an improved detector 10 is shown which includes a waveguide 11 for receiving microwave energy from a microwave source, for example a magnetron or klystron, as indicated by the arrow in FIG. 2. A thin semiconductor panel or slab 12 is positioned transversely within the waveguide and can have a cross-sectional area limited only by the cross-section area of the waveguide 11 within which it is mounted. The semiconductor panel can be a layer of dielectric material the conductivity of which can be varied by external excitation. Examples of such a material are semiconductors such as germanium, silicon, or cadmium sulfide. The semiconductor should have high resistivity and long lifetime for excess minority carriers; germanium meets these requirements. The conductivity of the semiconductor can be changed by photon excitation to create electron hole pairs when the energy of the incoming radiation to be measured exceeds the band gap of the semiconductor. The semiconductor germanium will respond to radiation from about 1.5 microns to the visible region; for higher frequencies, one would use a semiconductor with a different band gap, such as zinc oxide or zinc sulfide. The conductivity of the semiconductor also can be changed by thermal excitation when operation in the far infrared region is desirable; in this case, however, adequate cooling must be provided. The region of the waveguide between the input microwave source and the semiconductor 12 corresponds to the region I of FIG. 1, while the semiconductor panel 12 corresponds to region II of FIG. 1. The end of the waveguide remote from the input end is provided with a microwave short 14, shown in FIG. 2 as a screen through which infrared energy from an infrared source can be propagated as indicated by the wavy arrow in FIG. 2. The end of the waveguide in which the screen is positioned can be somewhat flared, as indicated in FIG. 2, in order to increase the aperture. The region of the waveguide between the semiconductor 12 and the microwave short 14 corresponds to the region III of FIG. 1. In this region is disposed an adjustable attenuator 15 which can be moved across the waveguide 11 to vary the conductivity $\delta'$ of the region of the waveguide between semiconductor 12 and the microwave short 14. If one is operating in the $TE_{01}$ mode, then the magnitude of the electric field increases as the attenuator 15 is moved away from the narrow walls of the waveguide toward the center thereof, thereby intercepting a region of greater electric field; consequently, the attenuation can be increased (that is, $\delta'$ decreased) as the attenuator 15 is moved further toward the center of the waveguide 11. In addition, a sliding stub tuner 16 can be moved within the slot 17 in waveguide 11 in the mutually perpendicular directions indicated by the arrows in FIG. 2, to vary the effective length $s$ of this region of the waveguide. Alternatively, the mesh screen 14, rather than being fixedly mounted, can be moved along the length of the waveguide 11, as in the case of the plunger 34 of FIG. 3, to change the effective length $s$ of this region; with this arrangement, the tuner 16 can be omitted. A directional coupler 20 is provided for coupling microwave energy reflected from the semiconductor 12 out of waveguide 11. This directional coupler 20 can be one of several available directional couplers and, for example, can have properly oriented coupling slots in the juxtaposed walls of the directional coupler, not visible in FIG. 2, through which the reflected electrical field $E_R$ can be coupled into the arm 21 of the directional coupler. The reflected energy in the directional coupler 20 is detected, as by means of a conventional microwave diode detector 25 mounted in the arm 21 of the directional coupler and connected by way of a coaxial connection 27 to an indicating device, such as a microammeter 28. Tuning of the diode 25 can be accomplished in the usual manner, as by a tuner, not shown in FIG. 2, which can be mounted in the end wall 51 of arm 21. If increased sensitivity is required, a coaxial coupler can be used in place of the microwave detector 25 and fed into a superheterodyne receiver which contains therein the appropriate microwave or i.f. detector and indicating means, such as an oscilloscope or meter. In practical operation, the microwave energy is supplied to one end of the waveguide 11 with no infrared energy impinging upon the semiconductor 12. The semiconductor for this dark or null condition has a null conductivity $\delta_0$ and some of the microwave radiation impinging upon the semiconductor may be reflected therefrom and coupled by way of the directional coupler through the indicating device. The reflectivity $E_R/E_{IN}$ in the dark or null condition is a direct function of the conductivity of the semiconductor. The reading of the indicating device thus becomes a measure of the microwave reflected power $(E_R/E_{IN})^2$. In order to minimize this reflected power, the effective length of transmission line between the semiconductor 12 and the microwave short 14, viz, the effective length $s$ of region III of FIG. 1, is varied by means of the sliding stub tuner 16 until the reflected power indication is a maximum. The position of the variable attenuator 15, and, hence the null conductivity $\delta'$ of this region, is now changed to obtain a still lower meter indication. This procedure may be repeated until an absolute minimum of reflected power is measured.

Now that Equations 10 and 17 have been satisfied, and the microwave background noise reduced to a minimum, the detector 10 is now ready for actual operation. As infrared energy is directed onto the semiconductor 12 through the screen 14, the conductivity $\delta$ of the semiconductor increases from that of the null condition, and the amount of increase is a direct function of the intensity of the increasing infrared radiation. Since the microwave power reflected from the semiconductor is proportional to the effective conductivity—of the semiconductor, it is evident that the amount of reflected power indicated by the indicating device is a measure of the intensity of the infrared radiation and the indicating device can be calibrated in terms of radiation and intensity.

A curve showing the relationship between reflected power and the change in conductivity of the semiconductor for a sample having a null conductivity of 2.0 mhos per meter is shown in FIG. 4. As shown in FIG. 4, the reflected power increases as the conductivity is increased and the relationship is substantially linear over the normal operating range of the detector. The minimum point shown on the curve of FIG. 4 is between $10^{-16}$ and $10^{-15}$; however, this minimum point will depend upon how well the detector is nulled by adjustment of the tuning means 15 and 16 of FIG. 2 or 15A and 34 of FIG. 3, as the case may be. The sensitivity of the detector can be readily appreciated from FIG. 4 from which a change in conductivity $\delta$ of from 0 to $10^{-5}$, i.e., from 2.0 mhos/meter$^{-1}$ to $2.0+2.0$ $(10^{-5})^{-1}=2.00001$ mho/meter$^{-1}$ will result in increased ratio of reflected power to input power of about $10^4$ or 10,000 times. Since the thickness $t$ of semiconductor 12 is small (a typical value of thickness is 500 micrometers), the photon efficiency is high; moreover, the null conductivity $\delta_0$ of the semiconductor can be kept reasonably low, for example, of the order of 2(ohm-meter)$^{-1}$, so that changes in conductivity corresponding to changes in infrared radiation intensity can be relatively large. The detector of FIG. 2 is a large area detector since the aperture can be made as large as that of the waveguide 11.

In carrying out an experiment to verify the theoretical calculations, an arrangement was utilized as shown in FIGS. 3 and 3a. This also represents a second embodiment of the invention. In this device 10A the microwave short comprises a solid plunger 34 which can be moved axially along waveguide 11A. Since this plunger is opaque to infrared radiation, as contrasted with the mesh 14 of FIG. 2, separate means must be provided for illuminating the semiconductor 12A with infrared radiation. This can be accomplished in the device of FIGS. 3 and 3A by admitting the infrared radiation into the waveguide 11A through one of the side walls of the waveguide. The infrared radiation to be measured, as indicated by the solid arrow, enters through an elongated slot 35 in a block 37 which fits against the narrow wall 41 of waveguide 11A. This infrared radiation then reflects from flat mirror 38 onto a cylindrical mirror 34 and thence through the slot 40 onto the semiconductor panel 12A. A similar mounting block 37' may be provided in some instances on the opposite side of the waveguide 11A from block 37, as shown in FIG. 3. This block 37' contains a slot 35' for admitting biasing optical radiation and directing the latter by way of mirrors 38' and 39' onto the semiconductor panel 12A. The purpose of this biasing radiation will be explained later. The semiconductor 12A is mounted between the ends of the blocks 37 and 37' and to adjustable assemblies 42 and 42' which can be adjusted to hold the semiconductor 12A between the corresponding retainers 44 and 44' and blocks 37 and 37'. Electrically insulating inserts are provided on the juxtaposed ends of both retainers and blocks. A cover plate 48, only a portion of which is shown in FIG. 3A, for the sake of clarity, is provided for the block assemblies 37, 37', 42 and 42', and can be attached to the top of the blocks 37 and 37' by screws 45 inserted within holes 46 in the blocks.

With the devices of FIGS. 3 and 3A, the plunger 34 corresponds to the microwave shorting medium IV of FIG. 4, the region between plunger 34 and semiconductor 12A corresponds to medium III of FIG. 1, the semiconductor 12A corresponds to the medium II of FIG. 1 and the region to the left of the semiconductor 12A corresponds to medium I in FIG. 1. The microwave energy, shown by the arrow labelled $E_{IN}$, is supplied to the waveguide 11A and microwave energy reflected from the semiconductor 12A is represented by arrow $E_R$ and is coupled to suitable detecting means, by a directional coupler, as in FIG. 2. The operation in the device of FIG. 3 is similar to that in connection with the device of FIG. 2 and consists of repeatedly varying first the position of plunger 34 and then the position of the attenuator 15A until a minimum reflection is measured in the dark or null condition. The microwave indicating device then will provide an indication of the intensity of infrared radiation which is now directed into the slot 38 in block 37 which has a minimum ratio of infrared signal to microwave background noise.

In some instances it has been found that a null reflection from the semiconductor panel can be obtained more easily with the aid of the optical biasing means described previously. By controllably varying the optical light admitted through slots 35' and 40', one can adjust the semiconductor conductivity very slightly rather than attempting a super-fine adjustment of the tuners 15A and 34.

While the invention has been described in connection with an illustrative embodiment, obvious modifications thereof are possible without departing from the spirt of the invention. Accordingly, the invention should be limited only by the scope of the appended claims.

What is claimed is:

1. A detector of incoming photon radiation comprising a wave guiding medium for propagating microwave energy from a microwave source, a microwave energy short positioned across said wave guiding medium comprising an electrically conductive screen, said screen being transparent to said incoming radiation, a thin semiconductor panel disposed within said medium in the path of said microwave energy between said source and said short, means for directing said radiation upon said semiconductor panel through said screen to change the conductivity thereof in proportion to the intensity of said radiation, and adjusting means located within said wave guiding medium, said semiconductor panel reflecting microwave energy incident thereon as a function of the conductivity of said semiconductor panel and of said portion of the wave guiding medium, said adjusting means minimizing reflection of microwave energy from said panel in the absence of said incoming radiation.

2. A detector according to claim 1 wherein said microwave short is moveable along said wave guiding medium and constitutes a portion of said adjusting means.

3. A detector according to claim 1 wherein said adjusting means includes a microwave attenuator disposed within said wave guiding medium between said semiconductor panel and said short for altering the conductivity and hence the attenuator constant thereof to permit a low value for the product of conductivity and thickness of said semiconductor panel.

4. A detector according to claim 1 wherein said adjusting means further includes an adjustable slide screw tuner for adjusting the effective length of said medium disposed between said panel and said semiconductor.

5. A detector according to claim 4 wherein said adjusting means includes a microwave attenuator disposed between said semiconductor panel and said short.

6. A detector according to claim 4 wherein said microwave short is moveable along said wave guiding medium and constitutes a portion of said adjusting means.

7. A detector according to claim 6 wherein said adjusting means includes a microwave attenuator disposed between said semiconductor panel and said short.

8. A detector according to claim 1 further including non-reciprocal coupling means for coupling out of said medium microwave energy reflected from said semiconductor panel in response to said incoming radiation, circuit means for detecting said reflected microwave energy, and indicating means responsive to said detected microwave energy.

9. A detector according to claim 8 wherein said microwave short is moveable along said wave guiding medium and constitutes a portion of said adjusting means.

10. A detector according to claim 8 wherein said circuit means includes a microwave detector disposed within said coupling means.

11. A detector according to claim 8 wherein said circuit means includes a superheterodyne receiver receptive of said reflected microwave energy, said receiver containing a radio frequency detector.

12. A detector according to claim 8 wherein said adjusting means further includes an adjustable slide screw tuner for adjusting the effective length of said medium disposed between said panel and said semiconductor.

13. A detector according to claim 12 wherein said microwave short is moveable along said wave guiding medium and constitutes a portion of said adjusting means.

14. A detector according to claim 13 wherein said adjusting means includes a microwave attenuator disposed between said semiconductor panel and said short.

15. A detector according to claim 14 wherein the transverse dimensions of said electrically conductive screen and said semiconductor panel are of the same order of magnitude as the transverse dimensions of said wave guiding medium.

16. A detector according to claim 12 wherein said adjusting means includes a microwave attenuator disposed between said semiconductor panel and said short.

17. A detector according to claim 8 wherein said adjusting means includes a microwave attenuator disposed within said wave guiding medium between said semiconductor panel and said short for altering the conductivity and hence the attenuator constant thereof to permit a low value for the product of conductivity and thickness of said semiconductor panel.

References Cited

UNITED STATES PATENTS

| | | | |
|---|---|---|---|
| 2,954,477 | 9/1960 | Pedersen et al. | 250—83.3 H |
| 3,612,883 | 10/1971 | Pedersen | 332—3 |
| 3,196,274 | 7/1965 | Giordmaine | 250—211 |
| 2,596,529 | 5/1952 | Clarke | 331—81 B |
| 2,978,652 | 4/1961 | Thomas | 250—211 |
| 3,163,835 | 12/1964 | Scott | 333—81 B |
| 2,856,589 | 10/1958 | Kazan | 332—3 |

JAMES W. LAWRENCE, Primary Examiner

H. A. DIXON, Assistant Examiner

U.S. Cl. X.R.

250—211 R